US012770089B2

(12) United States Patent
Wang et al.

(10) Patent No.: US 12,770,089 B2
(45) Date of Patent: Oct. 20, 2026

(54) METHOD AND APPARATUS FOR PROCESSING LOGISTICS WAYBILL, DEVICE AND STORAGE MEDIUM

(71) Applicant: ZHEJIANG HENGYI PETROCHEMICAL CO., LTD., Zhejiang (CN)

(72) Inventors: Peng Wang, Zhejiang (CN); Zhong Wu, Zhejiang (CN); Yiding Ren, Zhejiang (CN); Xiantao Peng, Zhejiang (CN); Junliang Jin, Zhejiang (CN); Zheng Teng, Zhejiang (CN); Jiabo Gao, Zhejiang (CN); Dandan Wang, Zhejiang (CN); Xuan Wu, Zhejiang (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 198 days.

(21) Appl. No.: 18/767,299

(22) Filed: Jul. 9, 2024

(65) Prior Publication Data

US 2025/0086566 A1 Mar. 13, 2025

(30) Foreign Application Priority Data

Sep. 13, 2023 (CN) ......................... 202311182628.3

(51) Int. Cl.
*G06Q 10/083* (2024.01)
*G06Q 10/087* (2023.01)

(52) U.S. Cl.
CPC ......... *G06Q 10/083* (2013.01); *G06Q 10/087* (2013.01)

(58) Field of Classification Search
CPC .... G06Q 10/083; G06Q 10/087; G06Q 10/08; G06Q 10/0875; G06Q 30/0635; Y02P 90/30
See application file for complete search history.

(56) References Cited

U.S. PATENT DOCUMENTS 6,915,268 B2 * 7/2005 Riggs ............... G06Q 10/06375 705/7.37
10,776,748 B2 * 9/2020 Jones ............... G06Q 10/08345
(Continued)

FOREIGN PATENT DOCUMENTS

CA 2478555 A1 9/2003
CN 115187179 A 10/2022
(Continued)

OTHER PUBLICATIONS

Japanese Patent Office; Notice of Reasons for Refusal; Japanese Application No. 2024-152227; 10 pages; dated Aug. 13, 2025.
(Continued)

*Primary Examiner* — Garcia Ade
(74) *Attorney, Agent, or Firm* — Faegre Drinker Biddle & Reath LLP

(57) ABSTRACT

Provided is a method and apparatus for processing a logistics waybill and a storage media. The method includes: acquiring a sales order to be delivered; splitting the sales order into multiple sub-orders according to the sales order and inventory information of multiple plant areas when the sales order needs to be split and arranged for shipment; planning and obtaining the logistics waybill according to shipment quantities and shipping addresses of the multiple sub-orders and a delivery address of the sales order; binding vehicle information of a delivery vehicle receiving the logistics waybill with the logistics waybill; generating a first instruction and sending the first instruction to a current pickup plant area based on position information of the
(Continued)

delivery vehicle before the delivery vehicle arrives at the current pickup plant area; and generating (S106) reconciliation settlement information when the logistics waybill is signed for.

17 Claims, 4 Drawing Sheets

(56) References Cited

U.S. PATENT DOCUMENTS

| | | | | |
|---|---|---|---|---|
| 11,080,652 | B2 * | 8/2021 | Chen | G06Q 30/04 |
| 11,983,665 | B2 * | 5/2024 | Lafrance | G06Q 10/06312 |
| 2003/0172007 | A1 * | 9/2003 | Helmolt | G06Q 10/06316<br>705/28 |
| 2015/0235173 | A1 | 8/2015 | Hall et al. | |
| 2020/0372453 | A1 * | 11/2020 | Song | G06Q 10/08355 |
| 2025/0029055 | A1 * | 1/2025 | Kim | G06Q 30/0601 |

FOREIGN PATENT DOCUMENTS

| | | | | |
|---|---|---|---|---|
| JP | 2002145418 | A | 5/2002 | |
| JP | 2002321829 | A | 11/2002 | |
| JP | 2003321122 | A | 11/2003 | |
| JP | 2004511402 | A | 4/2004 | |
| JP | 2004272802 | A | 9/2004 | |
| JP | 2004299861 | A | 10/2004 | |
| JP | 2015059044 | A | 3/2015 | |
| WO | WO-2023202244 | A1 * | 10/2023 | G06Q 10/0631 |

OTHER PUBLICATIONS

European Patent Office; European Extended Search Report; EP Application No. 24183592.5; 8 pages; dated Aug. 27, 2024.

* cited by examiner

METHOD AND APPARATUS FOR PROCESSING LOGISTICS WAYBILL, DEVICE AND STORAGE MEDIUM

CROSS-REFERENCE TO RELATED APPLICATIONS

The present application claims priority to Chinese Patent Application No. CN202311182628.3, filed with the China National Intellectual Property Administration on Sep. 13, 2023, the disclosure of which is hereby incorporated herein by reference in its entirety.

TECHNICAL FIELD

The present disclosure relates to the technical field of logistics, and particularly to the technical fields of logistics distribution and intelligent dispatching.

BACKGROUND

B2B (Business-to-Business) online mall can provide corporate customers with highly customized products and services. There are many links from placing an order in the B2B online mall to production, shipment, distribution, and financial settlement, and the process is complex, which involves a sales system, a financial system, a logistics distribution system, a warehousing system, a plant area vehicle management system when entering and exiting the plant area, and the like. Insufficient coordination between systems may affect the delivery efficiency of the entire order. Among them, the logistics distribution system is used to dispatch vehicles to pick up goods from sellers and deliver the goods to buyers, which is an important link that affects the delivery efficiency of the entire order.

SUMMARY

The present disclosure provides a method and apparatus for processing a logistics waybill, a device and a storage medium to solve or alleviate one or more technical problems in the prior art.

In a first aspect, the present disclosure provides a method for processing a logistics waybill, including:

acquiring a sales order to be delivered;

splitting the sales order into a plurality of sub-orders according to the sales order and inventory information of a plurality of plant areas in a case where the sales order needs to be split and arranged for shipment; where each of the plurality of sub-orders includes a shipment quantity and a shipping address of a corresponding plant area;

planning and obtaining the logistics waybill according to shipment quantities and shipping addresses of the plurality of sub-orders and a delivery address of the sales order;

binding vehicle information of a delivery vehicle receiving the logistics waybill with the logistics waybill;

generating a first instruction and sending the first instruction to a current pickup plant area based on position information of the delivery vehicle before the delivery vehicle arrives at the current pickup plant area; and generating reconciliation settlement information in a case where the logistics waybill is signed for.

In a second aspect, the present disclosure provides an apparatus for processing a logistics waybill, including:

an acquiring module, configured to acquire a sales order to be delivered;

a shipment arranging module, configured to split the sales order into a plurality of sub-orders according to the sales order and inventory information of a plurality of plant areas in a case where the sales order needs to be split and arranged for shipment; where each of the plurality of sub-orders includes a shipment quantity and a shipping address of a corresponding plant area;

a waybill distribution module, configured to plan and obtain the logistics waybill according to shipment quantities and shipping addresses of the plurality of sub-orders and a delivery address of the sales order;

a waybill arranging module, configured to bind vehicle information of a delivery vehicle receiving the logistics waybill with the logistics waybill;

a dispatching module, configured to generate a first instruction and send the first instruction to a current pickup plant area based on position information of the delivery vehicle before the delivery vehicle arrives at the current pickup plant area; and a settlement module, configured to generate reconciliation settlement information in a case where the logistics waybill is signed for.

In a third aspect, an electronic device is provided. The electronic device includes:

at least one processor; and a memory communicatively connected with the at least one processor; where, the memory stores instructions executable by the at least one processor, and the instructions when executed by the at least one processor, cause the at least one processor to perform the method according to any one of embodiments of the present disclosure.

In a fourth aspect, a non-transitory computer-readable storage medium storing computer instructions is provided. The computer instructions are used to cause the computer to perform the method according to any one of embodiments of the present disclosure.

The beneficial effects of the technical solution provided by the disclosure at least include: improving the efficiency of collaboration between the logistics link and other production and sales links, making the delivery of the entire product order more convenient and efficient.

It should be understood that what is described in this section is not intended to identify key or important features of the embodiments of the disclosure, nor is it intended to limit the scope of the disclosure. Other features of the present disclosure will become readily understood from the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some implementations provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those skilled in the art should understand that the present disclosure may be performed without certain specific details. In some examples, methods, means, elements and circuits etc. that are well known to those skilled in the art are not described in detail, in order to highlight the subject matter of the present disclosure.

Figure 1:
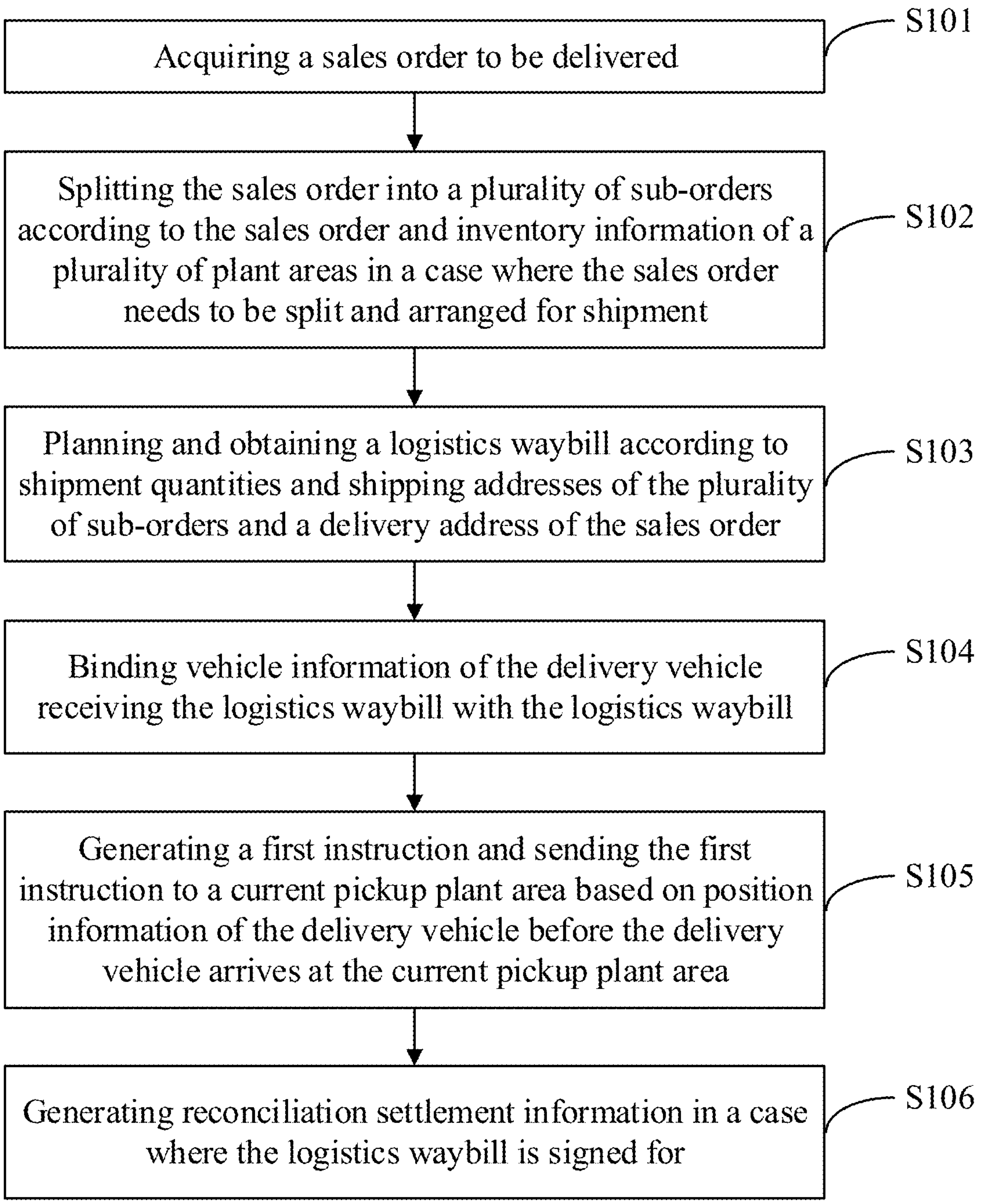
FIG. 1 is a schematic flowchart of a method for processing a logistics waybill according to an embodiment of the present disclosure.

FIG. 1 is a schematic flowchart of a method for processing a logistics waybill provided by an embodiment of the present disclosure. As shown in FIG. 1, the method at least includes the following steps.

S101, acquiring a sales order to be delivered.

Figure 2:
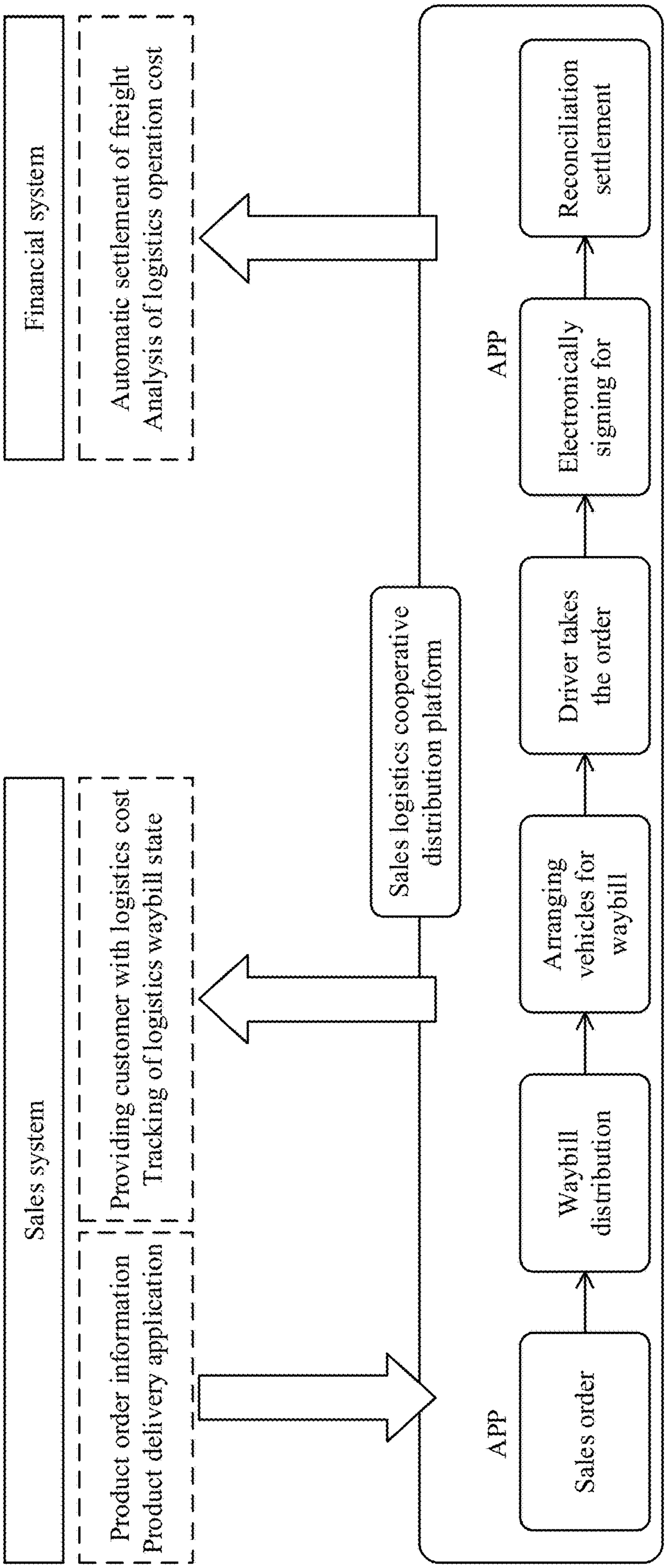
FIG. 2 is a schematic diagram of a processing process of a logistics waybill according to another embodiment of the present disclosure.

In the embodiment of the present disclosure, as shown in FIG. 2, the sales order to be delivered may be acquired from a sales system, and the order information of the sales order (also referred to as a product order) to be delivered may include one or more target products, and there are differences in product specifications, process parameters, and the like of various target products.

S102, splitting the sales order into a plurality of sub-orders according to the sales order and inventory information of a plurality of plant areas in a case where the sales order needs to be split and arranged for shipment. Each of the plurality of sub-orders includes a shipment quantity and a shipping address of the corresponding plant area.

In the embodiment of the present disclosure, the sales order needs to be split and arranged for shipment, it means that the sales order needs to be split and arranged for shipment from a plurality of plant areas. The reason for splitting and arranging for shipment may be that the demand for one type of target product in the sales order is too large, or there are too many types of products, and one plant area cannot fully deliver all the target products in the entire sales order. It may also be that a single plant area that can provide all target products is too far away and the transportation cost is too high, then other plant areas closer to the delivery place can be arranged to deliver part of the target products separately, that is, the waybill distribution as shown in FIG. 2.

It should be noted that the plant area may be a production plant area or a warehousing plant area that is independent of the production plant area. Generally speaking, the production plant area will be equipped with a warehousing area, or it may also be that a plurality of production plant areas correspond to one warehousing plant area. Therefore, a plant area may be understood as a park that can produce or store target products and ship them. The plant area is usually equipped with an access control equipment for managing incoming and outgoing vehicles.

S103, planning and obtaining a logistics waybill according to shipment quantities and shipping addresses of the plurality of sub-orders and a delivery address of the sales order.

In the embodiment of the present disclosure, planning and obtaining a logistics waybill may be understood as obtaining the spatial and quantitative distribution of goods that require logistics distribution according to the shipping addresses and shipment quantities of a plurality of sub-orders, so as to plan the number, model, and route sequence of delivery vehicles to obtain a logistics waybill corresponding to each of the sub-orders, thereby maximizing the transportation efficiency of delivery vehicles and reducing logistics costs. A plurality of sub-orders may correspond to one logistics waybill, and one sub-order may also correspond to a plurality of logistics orders, that is, arranging vehicles for the waybill as shown in FIG. 2. For example, determining the volume of goods according to the shipment quantity, and selecting a vehicle type matching the loading capacity from available delivery vehicles, thereby reducing the number of delivery vehicles used. For another example, when two or more mutually adjacent plant areas have some goods to be shipped cannot fill one vehicle, one delivery vehicle can be planned to go to the mutually adjacent plant areas in sequence to pick up the goods.

S104, binding vehicle information of the delivery vehicle receiving the logistics waybill with the logistics waybill.

After the logistics waybill is generated, it can be directly assigned to the corresponding vehicle and driver, or it may be published to the logistics distribution system, where the driver picks the logistics waybill on his own account, i.e., the driver takes the order as shown in FIG. 2. Through the platform-based logistics and distribution system, the third-party logistics capacity may be easily mobilized. Buyers may also register their own vehicles on the platform, so that they can obtain support from the corresponding system in other links when picking up goods on their own. The vehicle information of the delivery vehicle that receives the logistics waybill is bound with the logistics waybill, thereby facilitating the management of the delivery vehicles and allowing the delivery vehicles to obtain information-based support and collaboration.

S105, generating a first instruction and sending the first instruction to a current pickup plant area based on position information of the delivery vehicle before the delivery vehicle arrives at the current pickup plant area.

The location information of the delivery vehicle may be obtained through a positioning apparatus on the vehicle, or through a mobile terminal of the driver of the delivery vehicle.

Before the delivery vehicle arrives at the current pickup plant area, it can be understood that the time when the delivery vehicle arrives at the current pickup plant area meets a preset condition, or the distance between the delivery vehicle and the current pickup plant area meets a preset condition.

The first instruction is used to instruct the current pickup plant area to prepare for the arrival of the delivery vehicle, so as to improve the efficiency of picking up goods by the delivery vehicle at the current pickup plant area, for example, arranging the platform location and preparing corresponding goods in advance.

S106, generating reconciliation settlement information in a case where the logistics waybill is signed for.

The logistics waybill is signed for means that the delivery vehicle delivers all the target products in the logistics waybill to the designated delivery address and the logistics waybill is signed for by the buyer's personnel, i.e., electronically signing for as shown in FIG. 2. After the signing is completed, one or more sub-orders corresponding to the logistics waybill can be settled, that is, the reconciliation settlement as shown in FIG. 2.

The reconciliation and settlement information may include reconciliation and settlement information between the seller and the buyer, and may also include reconciliation and settlement information of the logistics carrier, thereby facilitating automatic settlement of freight charges.

According to the solution of the embodiment of the present disclosure, a sales order is split into a plurality of sub-orders, and a corresponding logistics waybill is planned and generated to achieve coordinated shipments from a plurality of plant areas; at the same time, the efficiency of collaboration between the logistics link and other links is improved, making the delivery of the entire product order more convenient and efficient.

In a possible implementation, splitting the sales order into a plurality of sub-orders according to the sales order and inventory information of a plurality of plant areas in the case where the sales order needs to be split and arranged for shipment in S102, further includes:

- S1021, determining a quantity demanded for a target product in the sales order;
- S1022, determining an inventory quantity of the target product in each of the plurality of plant areas;
- S1023, in the case where the sales order needs to be split and arranged for shipment, determining a plurality of shipping plant areas and corresponding shipment quantities from the plurality of plant areas according to the quantity demanded for the target product, the inventory quantities of the plurality of plant areas and a priority shipping rule; and
- S1024, obtaining a plurality of sub-orders according to the plurality of shipping plant areas and corresponding shipment quantities.

In the embodiment of the present disclosure, the target product in the sales order may be one type or a plurality of types. The splitting and arranging for shipment are performed according to the quantity demanded for each type of target product and the inventory quantities corresponding to a plurality of plant areas. When a plurality of plant areas all have inventory of target product, a priority shipping rule need to be considered. Common priority shipping rule includes the following rules.

First-in-first-out rule (FIFO): the products that are produced and arrive at the warehouse earliest are shipped out first. This ensures that products in inventory do not expire or spoil, and prompts enterprises to sell old inventory in a timely manner.

Last-in-first-out (LIFO) rule: the products that have recently arrived at the warehouse are shipped out first. This approach may result in older products remaining in the warehouse, but is sometimes used in tax planning.

Shipping out according to order priorities: which orders can be shipped first may be decided based on the priorities of customer's orders. An urgent order or an order from an important customer may obtain a higher priority.

Shipping out according to types or characteristics of products: Products of different types or characteristics may have different shipping priorities. For example, high value-added products may be prioritized for shipping because they may contribute more to the profit of the enterprise.

Shipping out according to remaining inventory: the enterprise may prioritize the shipping out of products with smaller remaining inventory to reduce inventory backlog.

Shipping out according to sales forecast: if the enterprise has sales forecast data, the shipping plan may be adjusted based on the data to ensure that the products are already prepared before the peak demand season.

Shipping out according to geographical location: if the enterprise has a plurality of warehouses or plant areas, which warehouse is used to ship out the product is decided based on the geographical location of the product from the customer. This can reduce logistics costs and shipping time.

Shipping out according to quality and inspection result: high-quality products are usually prioritized for shipping, while products that require further inspection or processing may be delayed for shipping.

Shipping out according to production date or batch number: the production date or batch number of products can be used to determine which products should be shipped out first to ensure freshness and compliance of the products.

In a possible implementation, planning and obtaining a logistics waybill according to the shipment quantities and shipping addresses of a plurality of sub-orders and a delivery address of the sales order in S103 further includes:

- determining an optimal vehicle combination according to the shipment quantities and shipping addresses of a plurality of sub-orders and maximum loading capacities of a plurality of types of delivery vehicles; and
- obtaining the logistics waybill according to a pickup quantity of each delivery vehicle in the optimal vehicle combination in at least one plant area, an address of the at least one plant area, and the delivery address of the sales order.

In the embodiment of the present disclosure, the basic steps of determining the optimal vehicle combination may include the following steps.

A. Collecting Data

Collecting the shipment quantity and location information of each warehouse.

Collecting information about available vehicles, including capacity, starting location, and the like.

B. Establishing a Mathematical Model

Determining the objective function: usually minimizing the transportation cost, including the driving cost of the vehicle.

Determining the constraints: for example, the maximum capacity of each vehicle, the maximum supply of each warehouse, the maximum driving distance of the vehicle, and the like.

C. Selecting an Optimization Algorithm

For this kind of combinatorial optimization problem, a heuristic algorithm such as greedy algorithm, genetic algorithm, simulated annealing, or the like may be used, or exact solution method such as Integer Linear Programming (ILP) may be used.

D. Establishing a Model

Converting the problem into a mathematical model and converting the objective function and constraints into mathematical expressions.

E. Solving the Optimization Problem

Using the selected algorithm to solve the established mathematical model to obtain the optimal transportation solution.

F. Generating a Waybill generating a plurality of logistics distribution waybills including a picking sequence and delivery sequence of the warehouse according to the optimal solution obtained by solving.

G. Verifying and Optimizing

Verifying whether the obtained solution conforms to the actual situation and meets the constraints.

If necessary, an iterative optimization may be performed, and different solutions may be tried to find a better solution.

In a possible implementation, binding the vehicle information of the delivery vehicle receiving the logistics waybill with the logistics waybill in S104, further includes:

obtaining the vehicle information of the delivery vehicle according to account information of the driver that receives the logistics waybill on the logistics distribution system; and binding the vehicle information with the logistics waybill within a task date of the logistics waybill.

In the embodiment of the present disclosure, after the driver picks the logistics waybill, the account information of the driver is associated with the logistics waybill. Binding the vehicle information with the logistics waybill only within the task date makes it easier for the driver to change the vehicle information before the task date. For example, when the driver's vehicle breaks down, the vehicle is replaced by another vehicle of the same size or model in the fleet. The task date may be pre-specified in the logistics waybill, or may be further selected by the driver within the date range specified in the logistics waybill. For example, the delivery time specified in the logistics waybill is any day between May 3 and May 10, from which the driver may select one day as the task date.

The vehicle information at least includes a license plate number of the vehicle, and may further includes specific information such as the type, color, and the like of the vehicle.

In a possible implementation, generating a first instruction and sending the first instruction to a current pickup plant area based on position information of the delivery vehicle before the delivery vehicle arrives at the current pickup plant area in S105, includes:

S1051, estimating travel time required for the delivery vehicle to arrive at the current pickup plant area in the logistics waybill according to the location information of the delivery vehicle using a logistics distribution system;

S1052, determining stocking time of the products to be shipped in the logistics waybill using a warehousing system of the current pickup plant area. Where the stocking time includes a first time length required to ship out all products to be shipped in the logistics waybill to the platform and a second time length required to complete a pre-shipping task; and S1053, generating a stocking instruction according to the travel time and stocking time, and sending the stocking instruction to the warehousing system of the current pickup plant area. Where the stocking instruction is used to instruct the warehousing system to ship out the product to be shipped.

In the embodiment of the present disclosure, estimating the travel time required for the delivery vehicle to arrive at the current pickup plant area in the logistics waybill may be performed directly according to the distance between the delivery vehicle and the current pickup plant area, or may be further accurately performed according to the route between the above two and the traffic flow information of the route, the number of traffic lights and historical traffic data.

The warehousing system may comprehensively determine the first time length required to ship out all products to be shipped in the logistics waybill to the platform according to the specific storage locations of all products to be shipped in the logistics waybill, the quantity of goods in each storage location, and the turnaround time required to complete the shipping at each storage location. In the same way, when there is a pre-shipping task, the second time required to complete the pre-shipping task may also be estimated.

According to the travel time and stocking time, a stocking instruction is generated and sent to the warehousing system of the current pickup plant area. The stocking instruction is used to instruct the warehousing system to generate a corresponding shipping task to ship out the products to be shipped in the logistics waybill. When the timing of generating and sending the stocking instruction is appropriate, the products to be shipped have already been stacked on the platform when the delivery vehicle enters the current shipping plant area, so that the delivery vehicle can start loading without waiting, thereby maximizing the pickup efficiency of delivery vehicle.

In a possible implementation, generating a stocking instruction according to the travel time and stocking time, and sending the stocking instruction to the warehousing system of the current pickup plant area in S1053 includes:

in a case where the second time length is 0 and the travel time is less than a first threshold, generating a first stocking instruction and sending the first stocking instruction to the warehousing system of the current pickup plant area, where the first stocking instruction has a first-level priority.

In the embodiment of the present disclosure, the second time length being 0 indicates that the outbound assembly line of the current warehousing system is idle. At this time, if the travel time of the delivery vehicle is less than the first threshold, the products to be shipped can be shipped out of the warehouse in advance and stacked on the platform, letting the goods wait for the delivery vehicle to arrive. The first threshold is used to control the time length of occupying the platform by the goods in advance. The first threshold may be adjusted according to the density degree of all logistics orders that need to be shipped out on the day and the occupancy ratio of the current platform. For example, when logistics orders are dense and the platform is busy, the first threshold may be 1 hour or less. On the contrary, when the platform is relatively idle, the first threshold may be set to 3 hours or longer.

In a possible implementation, generating a stocking instruction according to the travel time and stocking time, and sending the stocking instruction to the warehousing system of the current pickup plant area in S1053, includes:

in a case where the second time length is not 0, generating a second stocking instruction according to a product of the travel time and the stocking time and a preset coefficient, and sending the second stocking instruction to the warehousing system of the current pickup plant area, where the second stocking instruction has a second-level priority.

In the embodiment of the present disclosure, the second time length being not 0 indicates that the outbound assembly line of the warehousing system is continuing to work. At this time, it is necessary to notify the warehouse system to ship out goods when the travel time of the delivery vehicle is approximately equal to the stocking time, which can not only reduce the waiting time of the delivery vehicles, but also avoid affecting the entry and exit tasks of other logistics waybills. The preset coefficient may be any value between 0.7 and 1.3. For example, the preset coefficient is 1.2, assuming that the stocking time is 30 minutes, then when the travel time is less than 36 minutes, a second stocking instruction is generated and sent to the current pickup plant area. The preset coefficient may be adjusted according to the occupancy ratio of the platform in the current plant area. For example, if the occupancy ratio of the platform is high and the platform relatively busy, the preset coefficient may be adjusted lower to allow delivery vehicles to wait appropriately. The second-level priority of the second stocking instruction may be higher than the first-level priority of the first stocking instruction.

In a possible implementation, generating a stocking instruction according to the travel time and stocking time, and sending the stocking instruction to the warehousing system of the current pickup plant area in S1053, includes:

in a case where the travel time is less than the second time length, generating a third stocking instruction and sending the third stocking instruction to the warehousing system of the current pickup plant area, where the third stocking instruction has a third-level priority; or in a case where the travel time is less than the first time length, generating a fourth stocking instruction and sending the fourth stocking instruction to the warehousing system of the current pickup plant area, where the fourth stocking instruction has a fourth-level priority.

In the embodiment of the present disclosure, if the outbound assembly line of the warehousing system continues to be busy and the second time length required to complete the preliminary tasks is always high, then queuing the logistics waybill of the delivery vehicle to the shipping tasks of the warehousing system in advance when the travel time is less than the second time.

If the travel time is less than the first time length, it means that the delivery vehicle must wait for the goods to be shipped out after arriving at the current shipping plant area. At this time, the fourth stocking instruction may be generated and sent to the warehousing system of the current pickup plant area. The fourth stocking instruction has a fourth-level priority, and the fourth-level priority is higher than the third-level priority. The warehousing system may sort the shipping tasks according to the priorities of shipping tasks, and shipping tasks with the same priority are sorted according to the time when the shipping tasks are generated.

In a possible implementation, generating a first instruction and sending the first instruction to a current pickup plant area based on position information of the delivery vehicle before the delivery vehicle arrives at the current pickup plant area in S105, includes:

S1054, determining a distance between the delivery vehicle and the current pickup plant area according to the location information of the delivery vehicle using the logistics distribution system; and

S1055, in a case where the distance is less than a second threshold, generating a temporary passage instruction and send the temporary passage instruction to the plant area vehicle management system of the current pickup plant area, where the temporary passage instruction is used to instruct the plant area vehicle management system of the current pickup plant area to generate a temporary access permit for the delivery vehicle, such that the access control equipment in the current pickup plant area releases the delivery vehicle within a preset time range.

In the embodiment of the present disclosure, before the delivery vehicle arrives at the current pickup plant area, a temporary passage instruction is generated and sent to the plant area vehicle management system of the current pickup plant area, so that the plant area vehicle management system generates a temporary access permit for the delivery vehicle, and the access control equipment can automatically lift the pole to release the delivery vehicle when the delivery vehicle arrives at the entrance of the current pickup plant area, which eliminates the need for the driver to get off the vehicle to register, and improves the efficiency of picking up goods.

In a possible implementation, the method for processing a logistics waybill of the embodiment of the present disclosure further includes the steps of:

in the case where the delivery vehicle completes picking up of the goods in the current pickup plant area and leaves the plant area, deleting the temporary access permit; and in the case where there is a next pickup plant area in the logistics waybill, updating the next pickup plant area to be the current pickup plant area.

In the embodiment of the present disclosure, the completion of picking up may be determined according to pickup completion information generated by a delivery person of the warehouse after the loading is completed, and leaving the plant area may be determined according to shipping message generated by the plant area vehicle management system after the license plate number of the delivery vehicle is scanned by the access control equipment at the exit of the plant area. After the delivery vehicle picks up the goods and leaves the plant area, the temporary access permit is deleted.

If there is a next pickup plant area in the logistics waybill, updating the next pickup plant area to be the current pickup plant area, and re-executing step S105, or any of the steps S1051 to S1055.

Figure 3:
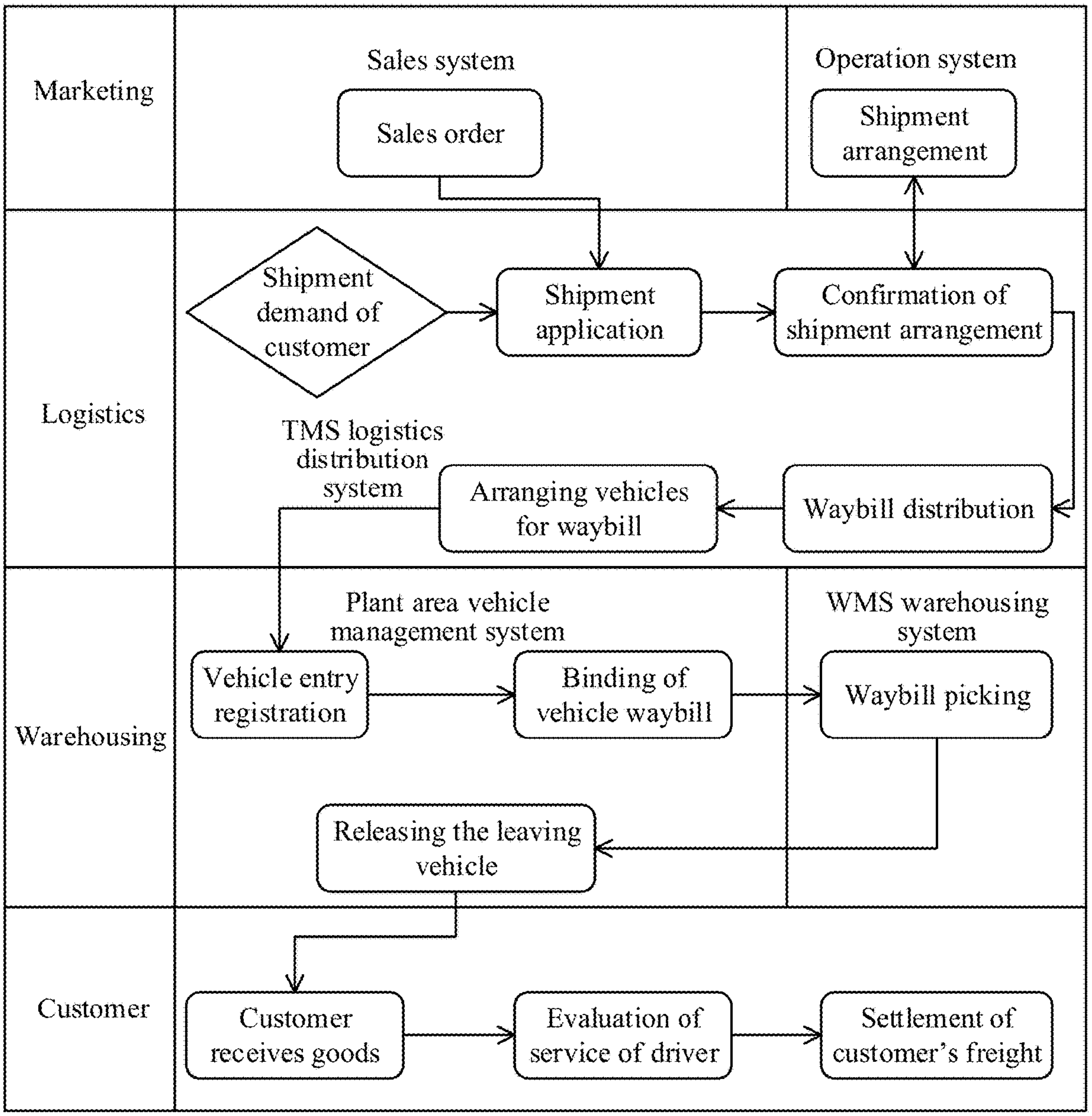
FIG. 3 is a schematic diagram of a complete delivery process of a sales order according to an embodiment of the present disclosure.

In a possible implementation, as shown in FIG. 3, the complete delivery process of a sales order includes the following steps.

(1) Acquiring a sales order from the sales system.

(2) After the customer submits a shipment application, arranging the sales order for shipment, arranging for one or more plant areas to ship out goods, and automatically generating a shipment arrangement plan.

(3) Confirmation of shipment arrangement: the automatically generated shipment arrangement plan may be manually confirmed to obtain a shipment arrangement result.

(4) Waybill distribution: planning, according to the shipment quantity and address of the shipping plant area in the shipment arrangement result, a distribution plan of the logistics delivery vehicle, and generating one or more corresponding logistics waybills.

(5) Arranging vehicles for the waybill: associating the logistics waybill with the account of the driver or vehicle information that receives the logistics waybill.

(6) Vehicle entry registration: generating a temporary access permit before the delivery vehicle arrives at the shipping plant area, so that the delivery vehicle may be automatically released upon entering the f plant area.

(7) Binding of vehicle waybill: after the vehicle arrives at the platform, the warehouse biller scans the vehicle and the goods to be shipped out, and binds the vehicle to the logistics waybill.

(8) Waybill picking: the warehouse delivery person picks the goods to be shipped out and loads them into the delivery vehicle.

(9) Releasing the leaving vehicle: the delivery vehicle is automatically released when it leaves the current shipping plant area, and the temporary access permit is deleted.

(10) Customer receives the goods: when the delivery vehicle arrives at the customer's delivery address, the customer receives the goods and signs electronically when the delivery is completed.

(11) Evaluation of service of the driver: evaluating the service of the driver.

(12) Settlement of customer's freight: after electronically signed, automatically generating reconciliation settlement information, to realize automatic settlement of logistics freight.

Figure 4:
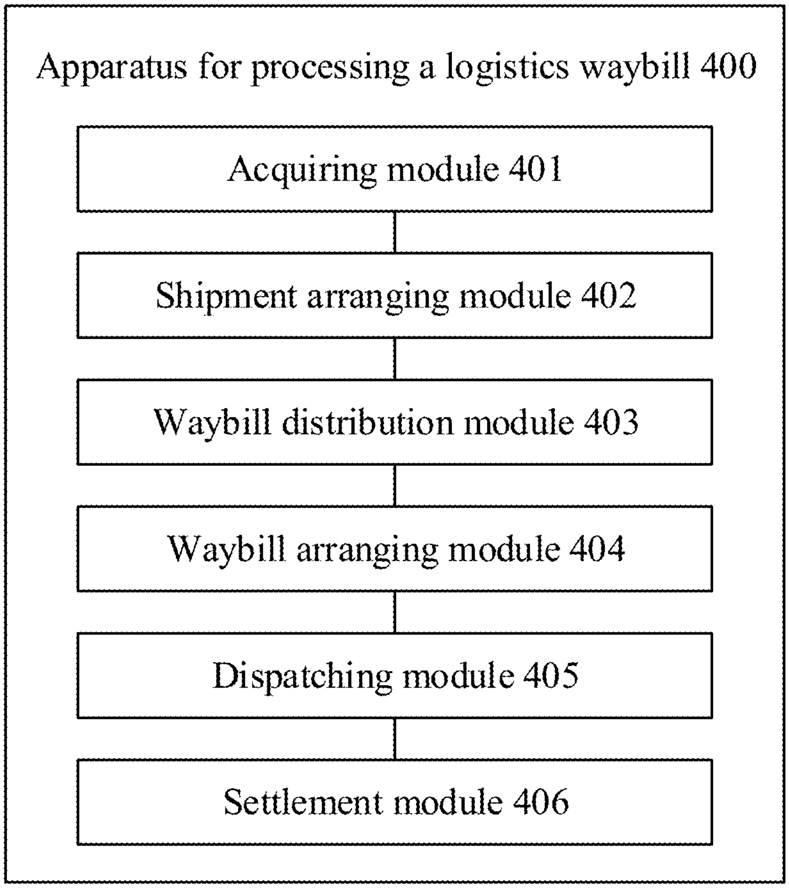
FIG. 4 is a schematic structural diagram of an apparatus for processing a logistics waybill according to an embodiment of the present disclosure.

FIG. 4 is a schematic structural diagram of an apparatus for processing a logistics waybill according to an embodiment of the present disclosure. As shown in FIG. 4, the apparatus at least includes:

an acquiring module 401, configured to acquire a sales order to be delivered;

a shipment arranging module 402, configured to split the sales order into a plurality of sub-orders according to the sales order and inventory information of a plurality of plant areas in a case where the sales order needs to be split and arranged for shipment. Where each of the plurality of sub-orders includes a shipment quantity and a shipping address of a corresponding plant area;

a waybill distribution module 403, configured to plan and obtain the logistics waybill according to shipment quantities and shipping addresses of the plurality of sub-orders and a delivery address of the sales order;

a waybill arranging module 404, configured to bind vehicle information of a delivery vehicle receiving the logistics waybill with the logistics waybill;

a dispatching module 405, configured to generate a first instruction and send the first instruction to a current pickup plant area based on position information of the delivery vehicle before the delivery vehicle arrives at the current pickup plant area; and a settlement module 406, configured to generate reconciliation settlement information in a case where the logistics waybill is signed for.

In a possible implementation, the shipment arranging module 402 is configured to:

determine a quantity demanded for a target product in the sales order;

determine an inventory quantity of the target product in each of the plurality of plant areas;

in the case where the sales order needs to be split and arranged for shipment, determine a plurality of shipping plant areas and corresponding shipment quantities from the plurality of plant areas according to the quantity demanded for the target product, inventory quantities of the plurality of plant areas and a priority shipping rule; and obtain the plurality of sub-orders according to the plurality of shipping plant areas and corresponding shipment quantities.

In a possible implementation, the waybill distribution module 403 is configured to:

determine an optimal vehicle combination according to the shipment quantities and shipping addresses of the plurality of sub-orders and maximum loading capacities of a plurality of types of delivery vehicles; and obtain the logistics waybill according to a pickup quantity of each delivery vehicle in the optimal vehicle combination in at least one plant area, an address of the at least one plant area, and the delivery address of the sales order.

In a possible implementation, the waybill arranging module 404 is configured to:

obtain the vehicle information of the delivery vehicle according to account information of a driver receiving the logistics waybill on a logistics distribution system; and bind the vehicle information with the logistics waybill within a task date of the logistics waybill.

In a possible implementation, the dispatching module 405 includes:

a first estimation sub-module configured to estimate travel time required for the delivery vehicle to arrive at the current pickup plant area in the logistics waybill according to the location information of the delivery vehicle using a logistics distribution system;

a second estimation sub-module configured to determine stocking time of products to be shipped in the logistics waybill using a warehousing system of the current pickup plant area. Where the stocking time includes a first time length required to ship out all products to be shipped in the logistics waybill to the platform and a second time length required to complete a pre-shipping task; and an instruction generation sub-module configured to generate a stocking instruction according to the travel time and stocking time, and send the stocking instruction to the warehousing system of the current pickup plant area, where the stocking instruction is used to instruct the warehousing system to ship out the product to be shipped.

In a possible implementation, the instruction generation sub-module is configured to:

in a case where the second time length is 0 and the travel time is less than a first threshold, generate a first stocking instruction and sending the first stocking instruction to the warehousing system of the current pickup plant area, where the first stocking instruction has a first-level priority.

In a possible implementation, the instruction generation sub-module is configured to:

in a case where the second time length is not 0, generate a second stocking instruction according to a product of the travel time and the stocking time and a preset coefficient, and send the second stocking instruction to the warehousing system of the current pickup plant area, where the second stocking instruction has a second-level priority.

In a possible implementation, the instruction generation sub-module is configured to:

in a case where the travel time is less than the second time length, generate a third stocking instruction and send the third stocking instruction to the warehousing system of the current pickup plant area, where the third stocking instruction has a third-level priority; or in a case where the travel time is less than the first time length, generate a fourth stocking instruction and send the fourth stocking instruction to the warehousing system of the current pickup plant area, where the fourth stocking instruction has a fourth-level priority.

In a possible implementation, the dispatching module 405 is configured to:

determine a distance between the delivery vehicle and the current pickup plant area according to the location information of the delivery vehicle using a logistics distribution system; and in a case where the distance is less than a second threshold, generate a temporary passage instruction and send the temporary passage instruction to a plant area vehicle management system of the current pickup plant area, where the temporary passage instruction is used to instruct the plant area vehicle management system of the current pickup plant area to generate a temporary access permit for the delivery vehicle.

In a possible implementation, the apparatus for processing a logistics order of the embodiment of the present disclosure further includes an updating module configured to:

in a case where the delivery vehicle completes picking up of goods in the current pickup plant area and leaves the current pickup plant area, delete the temporary access permit; and in a case where there is a next pickup plant area in the logistics waybill, update the next pickup plant area to be the current pickup plant area.

For descriptions of specific functions and examples of each module and sub-module of the apparatus in the embodiment of the present disclosure, reference may be made to the related descriptions of the corresponding steps in the method embodiment, and details will not be described herein again.

Figure 5:
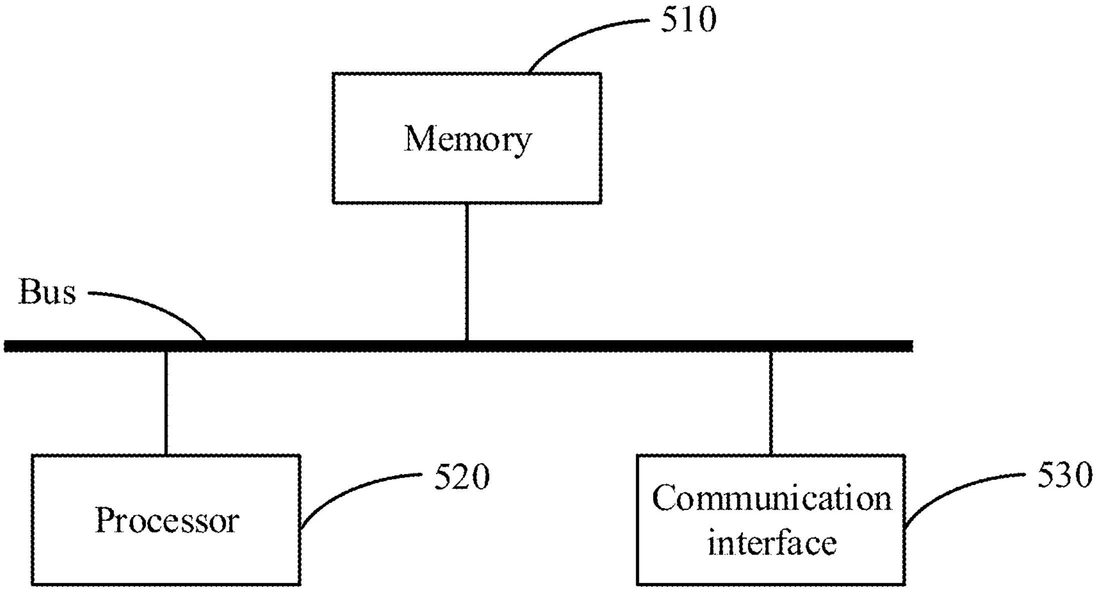
FIG. 5 is a block diagram of an electronic device used to implement embodiments of the present disclosure.

FIG. 5 is a block diagram of an electronic device according to an embodiment of the present disclosure. As shown in FIG. 5, the electronic device includes: a memory 510 and a processor 520. The memory 510 stores a computer program that can run on the processor 520.

The numbers of memory 510 and processor 520 may respectively be one or more. The memory 510 may store one or more computer programs. The one or more computer programs, when executed by the electronic device, cause the electronic device to perform the method provided by the method embodiment. The electronic device may further include: a communication interface 530, configured to communicate with an external device for interactive transmission of data.

If the memory 510, the processor 520, and the communication interface 530 are implemented independently, the memory 510, the processor 520, and the communication interface 530 may be connected to each other through a bus and complete communication with each other. The bus may be an Industry Standard Architecture (ISA) bus, a Peripheral Component Interconnect (PCI) bus, or an Extended Industry Standard Architecture (EISA) bus, etc. The bus may be divided into an address bus, a data bus, a control bus, and the like. For ease of presentation, only one thick line is used in FIG. 5, but it does not mean that there is only one bus or one type of bus.

Optionally, in terms of specific implementation, if the memory 510, the processor 520 and the communication interface 530 are integrated on one chip, the memory 510, the processor 520 and the communication interface 530 may complete the mutual communication through the internal interface.

It should be understood that the above-mentioned processor may be a Central Processing Unit (CPU), and it may also be other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, or the like. The general-purpose processor may be a microprocessor or any conventional processor, etc. It is worth noting that the processor may be a processor that supports Advanced RISC Machines (ARM) architecture.

Further, optionally, the above-mentioned memory may include a read-only memory and a random access memory, and may further include a non-volatile random access memory. The memory may be a volatile memory or non-volatile memory, or may include both volatile and non-volatile memory. Among them, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which is used as an external cache. By way of illustration, but not limitation, many forms of RAM are available. For example, a Static RAM (SRAM), a Dynamic Random Access Memory (DRAM), a Synchronous DRAM (SDRAM), a Double Data Date SDRAM (DDR SDRAM), an Enhanced SDRAM (ESDRAM), a Synchronous link DRAM (SLDRAM), and a Direct RAMBUS RAM (DR RAM).

In the above embodiments, it may be implemented in whole or in part by software, hardware, firmware, or any combination thereof. When implemented using software, it may be implemented in whole or in part in the form of a computer program product. The computer program product includes one or more computer instructions. When the computer instructions are loaded and executed on a computer, processes or functions described in accordance with embodiments of the present disclosure are produced in whole or in part. The computer may be a general-purpose computer, a special purpose computer, a computer network, or other programmable device. The computer instructions may be stored in a computer-readable storage medium, or be transmitted from one computer-readable storage medium to another, e.g., the computer instructions may be transmitted from a website, computer, server, or data center to another website, computer, server or data center through wired (such as coaxial cable, optical fiber, Digital Subscriber Line (DSL)) or wireless (such as infrared, Bluetooth, microwave, etc.) means. The computer-readable storage medium may be any available medium that can be accessed by a computer, or a data storage device such as a server integrated with one or more available media or data center. The available media may be a magnetic media (such as floppy disk, hard disk, magnetic tape), an optical media (such as Digital Versatile Disc (DVD)) or a semiconductor media (such as Solid State Disk (SSD)), etc. It is worth noting that the computer-readable storage media mentioned in the present disclosure may be non-volatile storage media, in other words, may be non-transitory storage media.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "an embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A method for processing a logistics waybill, implemented by at least one processor in an electronic device executing a computer-readable instruction stored in a memory in the electronic device, wherein the electronic device has the at least one processor and the memory connected in communication with the at least one processor, and the method comprises:

acquiring a sales order to be delivered;

splitting the sales order into a plurality of sub-orders according to the sales order and inventory information of a plurality of plant areas in a case where the sales order needs to be split and arranged for shipment, comprising:

determining a quantity demanded for a target product in the sales order;

determining an inventory quantity of the target product in each of the plurality of plant areas;

determining distances between each of the plurality of plant areas and geographical location of a customer;

in the case where the sales order needs to be split and arranged for shipment, determining a plurality of shipping plant areas and corresponding shipment quantities from the plurality of plant areas according to the quantity demanded for the target product, inventory quantities of the plurality of plant areas, a priority shipping rule and the distances between each of the plurality of plant areas and geographical location of the customer; and obtaining the plurality of sub-orders according to the plurality of shipping plant areas and corresponding shipment quantities; wherein each of the plurality of sub-orders comprises a shipment quantity and a shipping address of a corresponding plant area;

planning and obtaining the logistics waybill according to shipment quantities and shipping addresses of the plurality of sub-orders and a delivery address of the sales order;

binding vehicle information of a delivery vehicle receiving the logistics waybill with the logistics waybill;

generating a first instruction and sending the first instruction to a current pickup plant area based on position information of the delivery vehicle before the delivery vehicle arrives at the current pickup plant area; and generating reconciliation settlement information in a case where the logistics waybill is signed for.

2. The method of claim 1, wherein planning and obtaining the logistics waybill according to the shipment quantities and the shipping addresses of the plurality of sub-orders and the delivery address of the sales order, comprises:

determining an optimal vehicle combination according to the shipment quantities and shipping addresses of the plurality of sub-orders and maximum loading capacities of a plurality of types of delivery vehicles; and obtaining the logistics waybill according to a pickup quantity of each delivery vehicle in the optimal vehicle combination in at least one plant area, an address of the at least one plant area, and the delivery address of the sales order.

3. The method of claim 1, wherein binding the vehicle information of the delivery vehicle receiving the logistics waybill with the logistics waybill, comprises:

obtaining the vehicle information of the delivery vehicle according to account information of a driver receiving the logistics waybill on a logistics distribution system; and binding the vehicle information with the logistics waybill within a task date of the logistics waybill.

4. The method of claim 1, wherein generating the first instruction and sending the first instruction to the current pickup plant area based on the position information of the delivery vehicle before the delivery vehicle arrives at the current pickup plant area, comprises:

estimating travel time required for the delivery vehicle to arrive at the current pickup plant area in the logistics waybill according to the location information of the delivery vehicle using a logistics distribution system;

determining stocking time of products to be shipped in the logistics waybill using a warehousing system of the current pickup plant area, wherein the stocking time comprises a first time length required to ship out all products to be shipped in the logistics waybill to the platform and a second time length required to complete a pre-shipping task; and generating a stocking instruction according to the travel time and stocking time, and sending the stocking instruction to the warehousing system of the current pickup plant area, wherein the stocking instruction is used to instruct the warehousing system to ship out the product to be shipped.

5. The method of claim 4, wherein generating the stocking instruction according to the travel time and stocking time, and sending the stocking instruction to the warehousing system of the current pickup plant area, comprises:

in a case where the second time length is 0 and the travel time is less than a first threshold, generating a first stocking instruction and sending the first stocking instruction to the warehousing system of the current pickup plant area, wherein the first stocking instruction has a first-level priority;

in a case where the second time length is not 0, generating a second stocking instruction according to a product of the travel time and the stocking time and a preset coefficient, and sending the second stocking instruction to the warehousing system of the current pickup plant area, wherein the second stocking instruction has a second-level priority;

in a case where the travel time is less than the second time length, generating a third stocking instruction and sending the third stocking instruction to the warehousing system of the current pickup plant area, wherein the third stocking instruction has a third-level priority; or in a case where the travel time is less than the first time length, generating a fourth stocking instruction and sending the fourth stocking instruction to the warehousing system of the current pickup plant area, wherein the fourth stocking instruction has a fourth-level priority.

6. The method of claim 1, wherein generating the first instruction and sending the first instruction to a current pickup plant area based on the position information of the delivery vehicle before the delivery vehicle arrives at the current pickup plant area, comprises:

determining a distance between the delivery vehicle and the current pickup plant area according to the location information of the delivery vehicle using a logistics distribution system; and in a case where the distance is less than a second threshold, generating a temporary passage instruction and send the temporary passage instruction to a plant area vehicle management system of the current pickup plant area, wherein the temporary passage instruction is used to instruct the plant area vehicle management system of the current pickup plant area to generate a temporary access permit for the delivery vehicle.

7. The method of claim 6, further comprising:

in a case where the delivery vehicle completes picking up of goods in the current pickup plant area and leaves the current pickup plant area, deleting the temporary access permit; and in a case where there is a next pickup plant area in the logistics waybill, updating the next pickup plant area to be the current pickup plant area.

8. An electronic device, comprising:

at least one processor; and a memory communicatively connected with the at least one processor; wherein, the memory stores instructions executable by the at least one processor, and the instructions when executed by the at least one processor, cause the at least one processor to perform:

acquiring a sales order to be delivered;

splitting the sales order into a plurality of sub-orders according to the sales order and inventory information of a plurality of plant areas in a case where the sales order needs to be split and arranged for shipment, comprising:

determining a quantity demanded for a target product in the sales order;

determining an inventory quantity of the target product in each of the plurality of plant areas;

determining distances between each of the plurality of plant areas and geographical location of a customer;

in the case where the sales order needs to be split and arranged for shipment, determining a plurality of shipping plant areas and corresponding shipment quantities from the plurality of plant areas according to the quantity demanded for the target product, inventory quantities of the plurality of plant areas, a priority shipping rule and the distances between each of the plurality of plant areas and geographical location of the customer; and obtaining the plurality of sub-orders according to the plurality of shipping plant areas and corresponding shipment quantities; wherein each of the plurality of sub-orders comprises a shipment quantity and a shipping address of a corresponding plant area;

planning and obtaining the logistics waybill according to shipment quantities and shipping addresses of the plurality of sub-orders and a delivery address of the sales order;

binding vehicle information of a delivery vehicle receiving the logistics waybill with the logistics waybill;

generating a first instruction and sending the first instruction to a current pickup plant area based on position information of the delivery vehicle before the delivery vehicle arrives at the current pickup plant area; and generating reconciliation settlement information in a case where the logistics waybill is signed for.

9. The electronic device of claim 8, wherein planning and obtaining the logistics waybill according to the shipment quantities and the shipping addresses of the plurality of sub-orders and the delivery address of the sales order, comprises:

determining an optimal vehicle combination according to the shipment quantities and shipping addresses of the plurality of sub-orders and maximum loading capacities of a plurality of types of delivery vehicles; and obtaining the logistics waybill according to a pickup quantity of each delivery vehicle in the optimal vehicle combination in at least one plant area, an address of the at least one plant area, and the delivery address of the sales order.

10. The electronic device of claim 8, wherein binding the vehicle information of the delivery vehicle receiving the logistics waybill with the logistics waybill, comprises:

obtaining the vehicle information of the delivery vehicle according to account information of a driver receiving the logistics waybill on a logistics distribution system; and binding the vehicle information with the logistics waybill within a task date of the logistics waybill.

11. The electronic device of claim 8, wherein generating the first instruction and sending the first instruction to the current pickup plant area based on the position information of the delivery vehicle before the delivery vehicle arrives at the current pickup plant area, comprises:

estimating travel time required for the delivery vehicle to arrive at the current pickup plant area in the logistics waybill according to the location information of the delivery vehicle using a logistics distribution system;

determining stocking time of products to be shipped in the logistics waybill using a warehousing system of the current pickup plant area, wherein the stocking time comprises a first time length required to ship out all products to be shipped in the logistics waybill to the platform and a second time length required to complete a pre-shipping task; and generating a stocking instruction according to the travel time and stocking time, and sending the stocking instruction to the warehousing system of the current pickup plant area, wherein the stocking instruction is used to instruct the warehousing system to ship out the product to be shipped.

12. The electronic device of claim 11, wherein generating the stocking instruction according to the travel time and stocking time, and sending the stocking instruction to the warehousing system of the current pickup plant area, comprises:

in a case where the second time length is 0 and the travel time is less than a first threshold, generating a first stocking instruction and sending the first stocking instruction to the warehousing system of the current pickup plant area, wherein the first stocking instruction has a first-level priority;

in a case where the second time length is not 0, generating a second stocking instruction according to a product of the travel time and the stocking time and a preset coefficient, and sending the second stocking instruction to the warehousing system of the current pickup plant area, wherein the second stocking instruction has a second-level priority;

in a case where the travel time is less than the second time length, generating a third stocking instruction and sending the third stocking instruction to the warehousing system of the current pickup plant area, wherein the third stocking instruction has a third-level priority; or in a case where the travel time is less than the first time length, generating a fourth stocking instruction and sending the fourth stocking instruction to the warehousing system of the current pickup plant area, wherein the fourth stocking instruction has a fourth-level priority.

13. A non-transitory computer-readable storage medium storing computer instructions, wherein the computer instructions are used to cause a computer to perform:

acquiring a sales order to be delivered;

splitting the sales order into a plurality of sub-orders according to the sales order and inventory information of a plurality of plant areas in a case where the sales order needs to be split and arranged for shipment, comprising:

determining a quantity demanded for a target product in the sales order;

determining an inventory quantity of the target product in each of the plurality of plant areas;

determining distances between each of the plurality of plant areas and geographical location of a customer;

in the case where the sales order needs to be split and arranged for shipment, determining a plurality of shipping plant areas and corresponding shipment quantities from the plurality of plant areas according to the quantity demanded for the target product, inventory quantities of the plurality of plant areas, a priority shipping rule and the distances between each of the plurality of plant areas and geographical location of the customer; and obtaining the plurality of sub-orders according to the plurality of shipping plant areas and corresponding shipment quantities; wherein each of the plurality of sub-orders comprises a shipment quantity and a shipping address of a corresponding plant area;

planning and obtaining the logistics waybill according to shipment quantities and shipping addresses of the plurality of sub-orders and a delivery address of the sales order;

binding vehicle information of a delivery vehicle receiving the logistics waybill with the logistics waybill;

generating a first instruction and sending the first instruction to a current pickup plant area based on position information of the delivery vehicle before the delivery vehicle arrives at the current pickup plant area; and generating reconciliation settlement information in a case where the logistics waybill is signed for.

14. The non-transitory computer-readable storage medium of claim 13, wherein planning and obtaining the logistics waybill according to the shipment quantities and the shipping addresses of the plurality of sub-orders and the delivery address of the sales order, comprises:

determining an optimal vehicle combination according to the shipment quantities and shipping addresses of the plurality of sub-orders and maximum loading capacities of a plurality of types of delivery vehicles; and obtaining the logistics waybill according to a pickup quantity of each delivery vehicle in the optimal vehicle combination in at least one plant area, an address of the at least one plant area, and the delivery address of the sales order.

15. The non-transitory computer-readable storage medium of claim 13, wherein binding the vehicle information of the delivery vehicle receiving the logistics waybill with the logistics waybill, comprises:

obtaining the vehicle information of the delivery vehicle according to account information of a driver receiving the logistics waybill on a logistics distribution system; and binding the vehicle information with the logistics waybill within a task date of the logistics waybill.

16. The non-transitory computer-readable storage medium of claim 13, wherein generating the first instruction and sending the first instruction to the current pickup plant area based on the position information of the delivery vehicle before the delivery vehicle arrives at the current pickup plant area, comprises:

estimating travel time required for the delivery vehicle to arrive at the current pickup plant area in the logistics waybill according to the location information of the delivery vehicle using a logistics distribution system;

determining stocking time of products to be shipped in the logistics waybill using a warehousing system of the current pickup plant area, wherein the stocking time comprises a first time length required to ship out all products to be shipped in the logistics waybill to the platform and a second time length required to complete a pre-shipping task; and generating a stocking instruction according to the travel time and stocking time, and sending the stocking instruction to the warehousing system of the current pickup plant area, wherein the stocking instruction is used to instruct the warehousing system to ship out the product to be shipped.

17. The non-transitory computer-readable storage medium of claim 16, wherein generating the stocking instruction according to the travel time and stocking time, and sending the stocking instruction to the warehousing system of the current pickup plant area, comprises:

in a case where the second time length is 0 and the travel time is less than a first threshold, generating a first stocking instruction and sending the first stocking instruction to the warehousing system of the current pickup plant area, wherein the first stocking instruction has a first-level priority;

in a case where the second time length is not 0, generating a second stocking instruction according to a product of the travel time and the stocking time and a preset coefficient, and sending the second stocking instruction to the warehousing system of the current pickup plant area, wherein the second stocking instruction has a second-level priority;

in a case where the travel time is less than the second time length, generating a third stocking instruction and sending the third stocking instruction to the warehousing system of the current pickup plant area, wherein the third stocking instruction has a third-level priority; or in a case where the travel time is less than the first time length, generating a fourth stocking instruction and sending the fourth stocking instruction to the warehousing system of the current pickup plant area, wherein the fourth stocking instruction has a fourth-level priority.

* * * * *